May 17, 1955 B. VONDERSCHMITT 2,708,689
AUTOMATIC FREQUENCY CONTROL OF TELEVISION
DEFLECTION APPARATUS
Filed Feb. 25, 1953
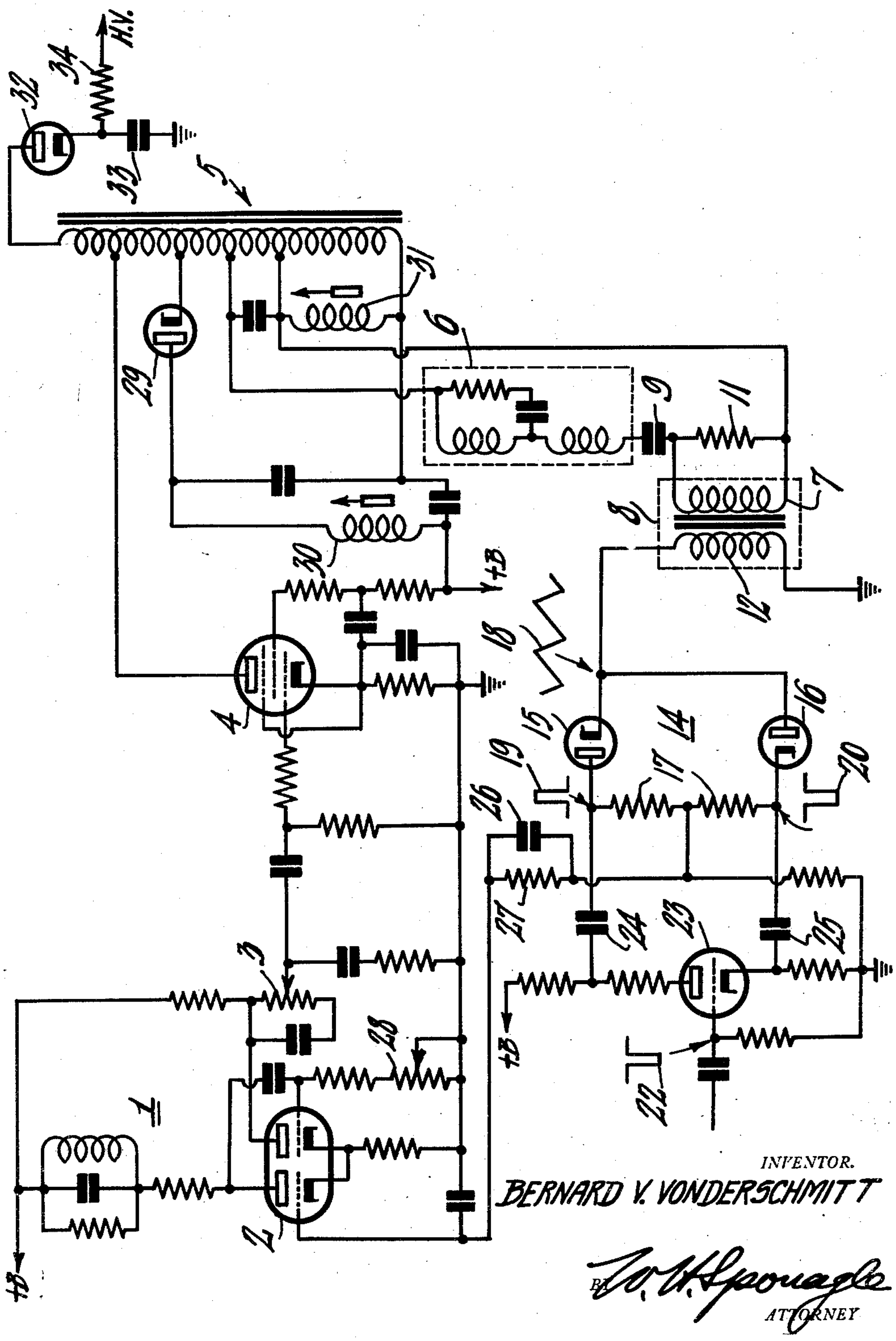
INVENTOR.
BERNARD V. VONDERSCHMITT
BY W. H. Sponagle
ATTORNEY United States Patent Office 2,708,689
Patented May 17, 1955

2,708,689

AUTOMATIC FREQUENCY CONTROL OF TELEVISION DEFLECTION APPARATUS

Bernard Vonderschmitt, Merchantville, N. J., assignor to Radio Corporation of America, a corporation of Delaware Application February 25, 1953, Serial No. 338,796
5 Claims. (Cl. 178—69.5)

This invention relates to the synchronization of television receivers and particularly to the automatic frequency control of the deflection wave generating apparatus of such receivers.

In systems of this character, it is customary to employ phase detecting apparatus for the comparison in phase of the received sync pulses and a locally generated reference wave. In a particular form of automatic frequency control apparatus, the reference wave has a substantially sawtooth form, the steep slopes of which coincide substantially with the retrace intervals of the beam deflection apparatus. In such systems, the horizontal sync pulses are compared in phase with the relatively steep portions of the sawtooth wave. In the past, it has been customary to form the sawtooth reference wave by integrating pulses derived from the deflection apparatus and occurring during flyback or retrace intervals.

The formation of a sawtooth reference wave by integrating flyback or retrace pulses has been found to be somewhat unsatisfactory in several respects. In the first place, such a practice has produced horizontal bends in the picture. Furthermore, the shaping of the pulses into the desired sawtooth form has required additional apparatus for that purpose. In using such apparatus, it has been inconvenient to provide a suitable isolation of the reference wave from direct current and also from the relatively high amplitude pulse voltages present in such deflection circuits.

Accordingly, it is an object of the present invention to provide an improved form of automatic frequency control apparatus of the type described which is free of most or all of the disadvantages referred to.

Another object of the invention is to provide an automatic frequency control system for a cathode ray tube beam deflection apparatus of the character described in which a small and relatively inexpensive transformer is used for the transfer of a sawtooth reference wave from the deflection output circuit to the phase detector circuit.

With reference to the present invention, it is used in a deflection system for the electron beam of a cathode ray tube which includes an output transformer that is energized by means of a substantially sawtooth wave derived from a sweep, or sawtooth, wave oscillator. Such a deflection system also includes a deflection yoke associated with the cathode ray tube and coupled to the output transformer. The automatic frequency control apparatus embodying the present invention includes a phase detector upon which the sync pulses are impressed and to which also is coupled a reference wave transformer which additionally is coupled to the deflection circuit at a point such as the output transformer. The reference wave transformer is coupled to the deflection apparatus in such a way that it is effectively in series with the deflection yoke for alternating current energy. In the output of the reference wave transformer, there is produced a substantially sawtooth wave which is compared in phase by the detecting apparatus with the sync pulses so as to develop a voltage which may be impressed upon the sawtooth wave oscillator for frequency control purposes.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawing.

The single figure of the drawing is a circuit diagram of a horizontal deflection wave generating an output apparatus, together with an automatic frequency control system in accordance with the invention.

Referring now to the drawing, there is disclosed a substantially sawtooth wave generating apparatus 1 including an oscillator comprising a double triode electron tube 2. The oscillator may be of the type covered by U. S. Patent 2,157,434 granted May 9, 1939, to J. L. Potter and titled "Oscillator Circuit." Such an oscillator functions to produce a substantially sawtooth wave which is impressed, in a suitable magnitude determined by the adjustment of a potentiometer 3, upon the input or grid circuit of a horizontal output or power amplifier electron tube 4. The output or anode circuit of the amplifier tube 4 is connected to a tap on a multi-tapped winding of an output transformer 5. A deflection yoke 6, which in the embodiment of the invention illustrated may be considered as the horizontal winding, is capacitively coupled to two other taps of the winding of the output transformer 5. Also, the primary winding 7 of a reference wave transformer 8 is coupled by means including a capacitor 9 effectively in series with the deflection yoke winding. A relatively small value resistor 11 also is connected in series with the deflection yoke winding to provide a sawtooth excitation voltage for the primary winding of the reference wave transformer.

The secondary winding 12 of the reference wave transformer 8 is connected to a terminal of a phase detector 14. Such a phase detector may be of the general character covered by U. S. Patent 2,358,545 granted September 19, 1944, to K. R. Wendt and titled "Television System." It includes a pair of inversely connected diodes 15 and 16 and a pair of substantially equal resistors 17. The reference wave derived from the secondary winding 12 of the reference wave transformer 8 is substantially of a sawtooth form 18.

There also is impressed upon the phase detector 14, particularly at the terminals of the resistors 17, oppositely phased, substantially equal amplitude sync pulses 19 and 20. These sync pulses are developed from a separated sync pulse 22 derived from a suitable source as indicated and impressed upon the input circuit of a phase inverter including an electron tube 23. The phase inverter may be of the general character covered by U. S. Patent 2,027,054 granted January 7, 1936, to B. F. Miessner and titled "Amplifier System." The anode and cathode circuits of the phase inverter tube 23 are coupled respectively by capacitors 24 and 25 to the phase detector 14 substantially as described.

The output of the phase detector is coupled by means including a capacitor 26 and a resistor 27 to the fine frequency and phase control circuit of the sawtooth wave generating oscillator 1. Such a circuit may include the control grid of one of the triode sections of the tube 2. A coarse frequency control of the oscillator may be manually effected by a variable resistance in the form of a potentiometer 28 connected to the control grid of the other triode section of the tube 2.

The deflection circuit also includes such other conventional apparatus as a damper diode 29 coupled between the source of space current such as indicated at +B and another tap on the deflection output transformer 5 in series with a variable inductor 30 which may be adjusted for linearity control of the horizontal deflection. Another variable inductor 31 is connected to another portion of the tapped deflection output transformer winding substantially as shown and may be varied for a control of the width or horizontal size of the picture. Also, the deflection apparatus has associated therewith a high voltage power supply including a diode rectifier 32 and a filter network including a capacitor 33 and a resistor 34.

In the operation of the apparatus described, the diodes 15 and 16 of the phase detector 14 are biased normally for non-conduction. The phase relationship between the applied sync pulses 19 and 20 and the sawtooth reference wave 18 is such that the sync pulses occur in the region including the relatively steep portion of the sawtooth wave. The applied sync pulses serve to render the diodes 15 and 16 conducting momentarily, thereby permitting current to flow through the diodes and the resistors 17 in such direction and magnitude as determined by the instantaneous amplitude of the steep portion of the sawtooth wave 18 existing at the time of occurrence of the sync pulses. It is seen that the voltage produced in the resistors 17 then is representative of both the sense and the magnitude of any detected phase deviation. Such a voltage, when applied to the oscillator 1, effects a suitable adjustment in its operation to effect the desired synchronization thereof with the received sync pulses.

It was seen that, in accordance with the present invention, there is provided an improved form of automatic frequency control apparatus which produces the beneficial result of effecting control of a sweep oscillator by means including substantially sawtooth wave energy derived from the deflection circuits. This sawtooth wave, such as 18, is initially developed in the resistor 11 which is traversed by the substantially sawtooth deflection current. The small reference wave transformer 8 provides a means by which the sawtooth voltage developed in the resistor 11 is made available at a lower impedance point such as the phase detector 14 without, at the same time, impressing upon the phase detector the relatively high positive voltage pulse which is present in the resistor 11. Such an automatic frequency control system including a sawtooth wave transfer device, such as the transformer 8, is particularly useful in a system such as that disclosed where the low impedance portion of the yoke 6 is not returned to either A.-C. or D.-C. ground potential. Inasmuch as in such circumstances there is developed at the low impedance point of the yoke 6 a very high pulse such as, for example, one having a value of approximately 500 volts in addition to another 500 volts D.-C., the transformer 8 provides an effective means to transfer to the relatively low impedance circuit of the phase detector 14 a sawtooth wave of voltage such as the wave 18 which has neither a D.-C. component nor a high voltage pulse component.

The nature of the invention having been pointed out in the foregoing description of an illustrative embodiment thereof, its scope is pointed out in the appended claims.

What is claimed is:

1. In a system for deflecting an electron beam of a cathode ray tube in synchronism with sync pulses and including an output transformer energized by a substantially sawtooth wave developed under the control of an oscillator, said output transformer being coupled to a deflection yoke, automatic frequency control apparatus comprising, a phase detector, means impressing sync pulses upon said phase detector, a reference wave transformer coupled to said deflection yoke and producing a substantially sawtooth wave at the desired deflection frequency, and means coupling said reference wave transformer to said phase detector for the comparison of said sawtooth wave with said sync pulses to develop a frequency control voltage for said oscillator.

2. In a system for deflecting an electron beam of a cathode ray tube in synchronism with sync pulses and including an output transformer energized by a substantially sawtooth wave developed under the control of an oscillator, said output transformer being coupled to a deflection yoke, automatic frequency control apparatus comprising, a phase detector, means impressing sync pulses upon said phase detector, a reference wave transformer having an input circuit coupled for alternating current to said deflection yoke and having an output circuit in which to develop a substantially sawtooth wave at the desired deflection frequency, and means coupling the output circuit of said reference wave transformer to said phase detector for the comparison of said sawtooth wave with said sync pulses to develop a frequency control voltage for said oscillator.

3. In a system for deflecting an electron beam of a cathode ray tube in synchronism with sync pulses and including an output transformer energized by a substantially sawtooth wave developed under the control of an oscillator, said output transformer being coupled to a deflection yoke, automatic frequency control apparatus comprising, a phase detector, means impressing sync pulses upon said phase detector, means capacitively coupled effectively in series with said deflection yoke to develop a substantially sawtooth reference wave at the desired deflection frequency, a reference wave transformer having a primary winding coupled to said sawtooth wave developing means and a secondary winding, and means coupling the secondary winding of said reference wave transformer to said phase detector for the comparison of said sawtooth wave with said sync pulses to develop a frequency control voltage for said oscillator.

4. In a system for deflecting an electron beam of a cathode ray tube in synchronism with sync pulses and including an output transformer energized by a substantially sawtooth wave developed under the control of an oscillator, said output transformer being coupled to a deflection yoke, automatic frequency control apparatus comprising, a phase detector, means impressing sync pulses upon said phase detector, a resistor coupled capacitively in series with said deflection yoke to effect the development of a substantially sawtooth wave at the desired deflection frequency, a reference wave transformer having primary and secondary windings, means coupling said primary winding to said resistor, and means coupling the secondary winding of said reference wave transformer to said phase detector for the comparison of said sawtooth wave with said sync pulses to develop a frequency control voltage for said oscillator.

5. In a system for deflecting an electron beam of a cathode ray tube in synchronism with sync pulses and including an output transformer having a tapped winding energized by a substantially sawtooth wave developed under the control of an oscillator, two of said output transformer taps being coupled to a deflection yoke, automatic frequency control apparatus comprising, a phase detector, means impressing sync pulses upon said phase detector, a reference wave transformer having primary and secondary windings, a resistor and a capacitor coupled in circuit between said deflection yoke and one of said two output transformer taps, whereby to effect the development in said resistor of a substantially sawtooth wave at the desired deflection frequency, means coupling the primary winding of said reference wave transformer to said resistor, and means coupling the secondary winding of said reference wave transformer to said phase detector for the comparison of said sawtooth wave with said sync pulses to develop a frequency control voltage for said oscillator.

References Cited in the file of this patent

UNITED STATES PATENTS

| | | |
|---|---|---|
| 2,521,504 | Dome | Sept. 5, 1950 |
| 2,597,743 | Millspaugh | May 20, 1952 |